UNITED STATES PATENT OFFICE.

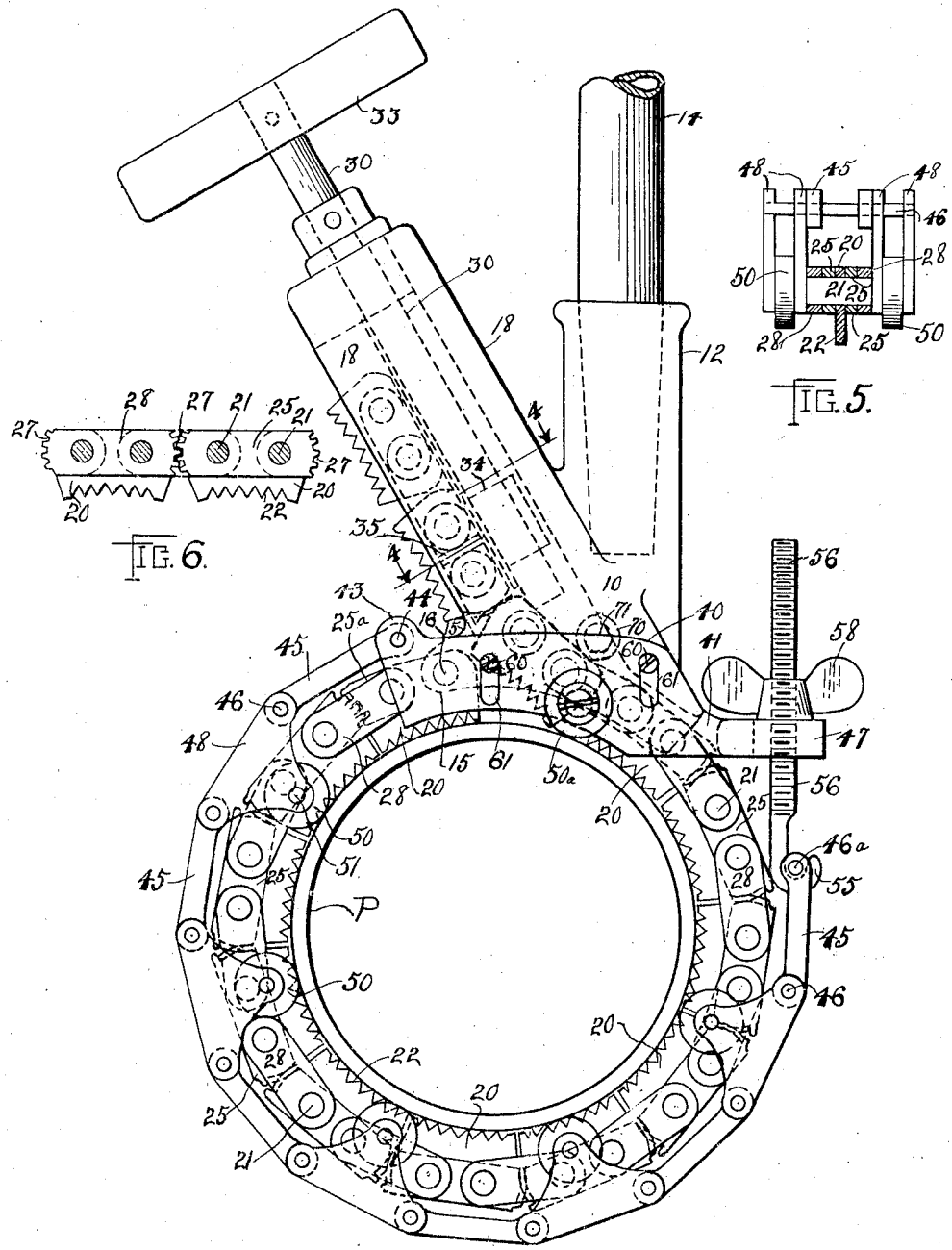

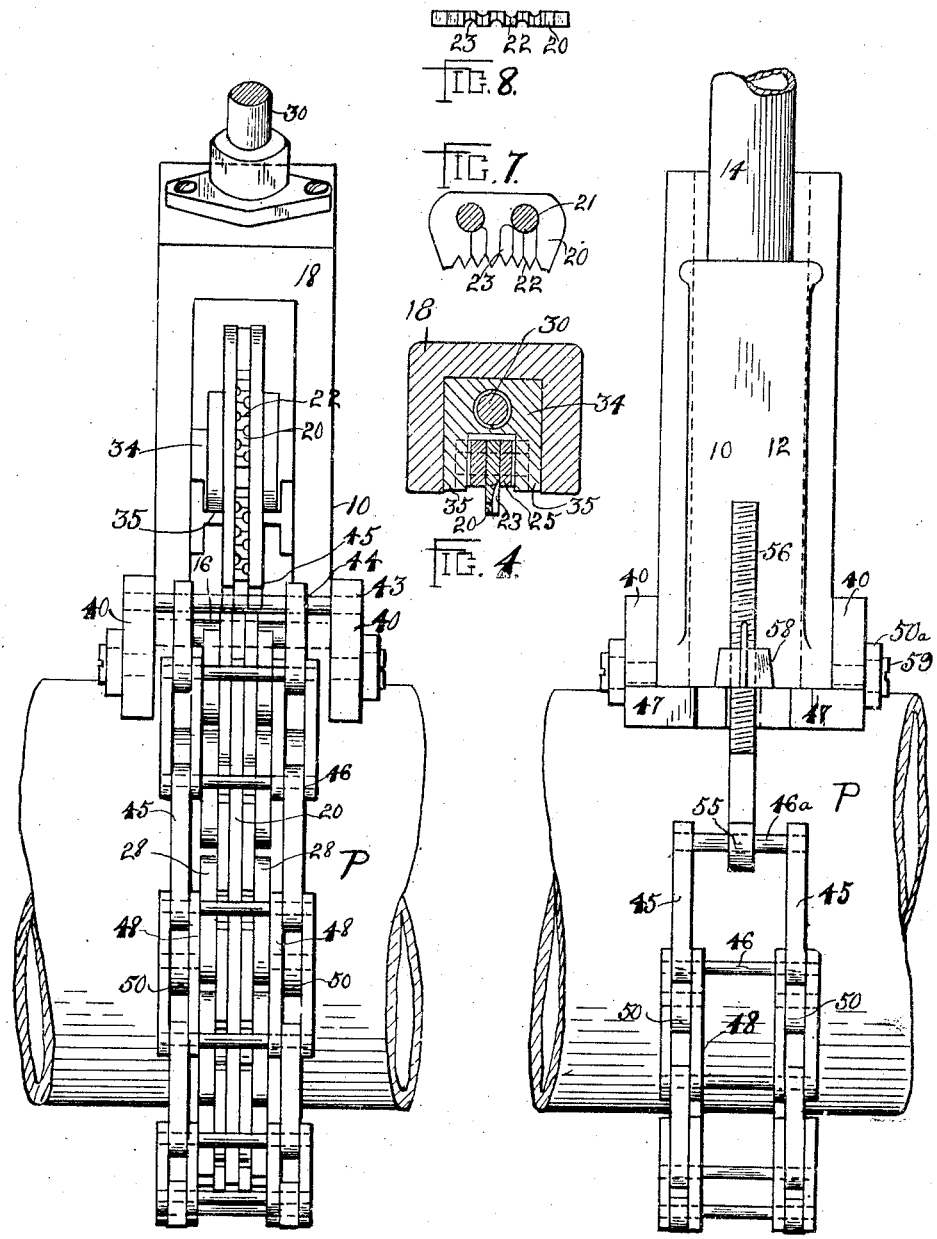

IRA W. NONNEMAN, OF WARREN, OHIO, ASSIGNOR TO THE BORDEN COMPANY, OF WARREN, OHIO, A CORPORATION OF OHIO.

PIPE AND TUBE SAW.

1,344,428.   Specification of Letters Patent.   Patented June 22, 1920.

Application filed February 6, 1918. Serial No. 215,587.

*To all whom it may concern:*

Be it known that I, IRA W. NONNEMAN, residing at Warren, in the county of Trumbull and State of Ohio, have invented a certain new and useful Improvement in Pipe and Tube Saws, of which the following is a full, clear, and exact description, reference being had to the accompanying drawings.

This invention relates to an articulated chain provided with cutting teeth and arranged to saw a pipe or tube. The object of the invention is to provide a cutting chain for this purpose which shall be simple in construction, capable of being comparatively cheaply manufactured and shall produce efficient, accurate and rapid results in sawing metal pipes and tubes.

In carrying out my invention I provide a series of sawing elements, each having a plurality of saw teeth on its inner edge, and the successive elements being pivotally connected in alinement to make an articulated saw or sawing chain adapted to embrace the pipe or tube and be moved with reference to it to effect the cutting. I provide intermeshing gear teeth on the ends of adjacent sawing elements to keep these elements in proper arcual registration for various sizes of pipes and to insure their action with a uniform pressure for cutting the pipe.

The saw may be provided with means for anchoring one end and drawing on the other to maintain it taut during the operation, or, in other words, to feed it into the pipe. I find that the cutting movement of the saw relative to the pipe may readily be oscillatory, though the present invention is not limited thereto.

My invention is hereinafter more fully described in connection with mechanism for guiding the saw and feeding it and giving it oscillatory movements about the pipe. Such construction is shown in the drawings hereof.

Referring to the drawings, Figure 1 is a side elevation of a pipe cutter employing my saw in position on a pipe, part of the operating handle of the tool being broken away; Fig. 2 is an edge view of the cutter looking toward the same from the left hand side of Fig. 1, the feeding handle being sectioned; Fig. 3 is an edge view looking toward the cutter from the right hand side of Fig. 1; Fig. 4 is a sectional detail of the feeding means, being taken on a line indicated at 4—4 of Fig. 1; Fig. 5 is a transverse section through the saw chain and guide chains; Fig. 6 is a sectional side elevation of the guide chains showing the intergeared links; Fig. 7 is a detail, in side elevation, of one of the sawing elements with the toothed links removed; Fig. 8 is a view of the cutting edge of one of the sawing elements.

Describing, by the use of reference numerals, particular adaptation of the invention shown in the drawings, 10 designates a head member having an outwardly extending boss 12 adapted to receive the threaded end of an actuating handle in the nature of a pipe 14. The head is also provided with integral ears 15 adapted to stand adjacent the pipe and carry a pin 16 extending parallel with the pipe and to which may be attached one end of the cutting chain. The chain extends from its anchorage around the pipe, and has a free end portion extending outwardly along a substantially longitudinal guide 18 formed integral with the head. Mounted in this guide are means for drawing the end portion of the chain outwardly and thus feeding the cutting elements into the pipe. This, briefly, is one manner of mounting and using my improved pipe saw, and will be more fully described hereinafter.

The cutting elements 20 of the sawing chain, which constitutes the subject matter of the present invention, are of the form shown in Figs. 7 and 8, being thin plates provided with teeth 22 at the inner sides of the elements. These teeth are arranged on a suitable arc selected with a view to cutting pipes between certain sizes,—the intermediate teeth serving to do the greater portion of the work on a smaller pipe while the teeth adjacent the ends of the element may do the greater part of the cutting when acting upon a pipe of larger diameter. These elements are preferably flat, steel pieces adapted to take a proper temper, and I find that the cutting may be facilitated by removing a portion of the element at one side of the teeth at alternate sides of the element by grinding grooves 23 extending radially outward from the cutting edge.

At each side of the cutting elements are links 25 having openings closely embracing pins 21 extending through the elements. These links are provided at their opposite ends with gear teeth 27 formed in an arc concentric with the pins 21, the teeth 27 of one link meshing with the teeth of the adjacent link. Thus one of the members 20 with the links 25 at each side thereof, forms in effect a single link of a chain, and these reinforced sawing links are connected by links 28 overlapping the adjacent links 25 and embracing adjacent pins 21 of adjoining sawing links, as shown.

The effect of the gear teeth 27 is to keep the successive toothed elements 20 in a true arc when in position on a pipe, with the result that all of the cutting elements acting on the pipe may engage the same with uniform pressure, and maintain such uniformity as the chain is contracted during the operation of sawing.

The anchor pin 16 extends through one of the openings in one of the cutting elements 20 and through the registering openings of the ears 15 of the head 10 to hold one end of the chain. As there would be no function for the gear teeth at the ends of these particular links 25 toward the head 10, the links in this position indicated at 25$^a$ are shown as having the teeth omitted at that end.

The cutting chain extends from the anchorage around the pipe and upwardly into the guide way formed in the under inclined side of the guide member 18. This member 18 is shown as carrying a screw 30 parallel with the guide way and journaled at the outer end of the member and provided with an extension carrying a suitable actuating handle 33. A nut 34 on this screw is movable along the guide way and has laterally extending fingers 35 rigid therewith, and adapted to embrace the cutting chain at a point between the links 28. This turning the handle 33 in a direction to move the nut 34 outwardly from the pipe forces the cutting chain into close engagement with the pipe and thereby provides for feeding the cutting elements into the pipe.

It will be seen that by oscillating the head 10 about the pipe, with the chain in position as shown in Fig. 1, each of the elements 20 will reciprocate circumferentially of the pipe with a result that the teeth 22 will saw into the pipe and remove a portion of the metal thereof upon each such movement. By actuating the feed screw 30, the teeth 22 may be forced progressively into the pipe as the oscillations are continued, thus severing the pipe.

I find it important in securing the best results, that the cutting chain be guided and maintained in perfect circumferential alinement, and I also find it desirable to hold the head 10 with the long operating handle 14 against movement from a radial plane, to prevent clamping or breaking of the saw elements. To accomplish these results, I may provide a yoke member 40 slidably embracing the head adjacent the pipe and comprising essentially a bifurcated member connected at 41 and having its separated portions extending circumferentially of the pipe and across the head, and provided at 43 with ears carrying a pin 44 parallel to the axis of the pipe and extending through the ends of guide chain links 45. These guide chain links extend to pins 46 of the chain to which are attached four parallel links 48 (Fig. 5) arranged in pairs at each side of the cutting chain and each pair embracing a freely rotatable roller 50 journaled to a pin 51, rigidly carried by the adjacent links 48. The links 45 are also preferably arranged in pairs, slightly separated as shown particularly in Fig. 5, so that the guide chain may be comparatively wide and effectively resist lateral tipping.

It will be seen that the links 45 and the two pairs of links 48 alternate circumferentially to make a chain which carries rollers 50 at each side of the cutting chain, whereby there is provided a plurality of rollers 50 which may be brought into close contact with the periphery of the pipe and roll freely about the same, during the oscillation of the cutter. On the opposite end of this chain, I prefer to provide a short pin 46$^a$ which may be engaged by a hook 55 formed on the end of a screw 56 adapted to stand in a notch or slot formed in an extension 47 at the connecting portion of the yoke 40, while a suitable thumb nut 58 on this screw may serve to tension the guide chain.

As stated the head 10 is loosely embraced by the yoke 40, and I prefer to secure the yoke to the head in a manner still permitting relative approximately radial movement between the yoke and the head, and accordingly I provide screws 60, threaded in the head 10 and projecting outwardly into the parallel slots 61, one of which is shown as substantially radial to the pipe being cut.

On certain sizes of pipes the rollers 50 carried by the chain may not embrace a sufficient portion of the circumference to secure satisfactory results. Accordingly I provide on each side of the yoke 40, rollers 50$^a$ secured by suitable screws 59.

A more complete description of the operation of this embodiment of the invention is as follows:

To sever a pipe, indicated at P, the cutting chain is wrapped around the pipe and extended through the head 10 and upwardly into the ways, as shown in Fig. 1. In this position, the fingers 35 engage with the chain, lying between two pairs of the links 28. The guide chain is then wrapped around the pipe and the pin 46ª caused to engage the hook 55 on the screw 56 which is then drawn outwardly to bring the rollers 50 into close engagement with the exterior of the pipe. As the inner link of each pair of the links 48 closely embrace the outer links 28 of the cutting chain, true alinement of the cutting chain is thus insured, and may then be drawn into close engagement with the exterior of the pipe by actuating the screw 30. The cutting is now started by moving the cutter about the axis of the pipe, preferably by merely oscillating the handle 14, and as the cutting progresses the handle 33 is turned occasionally to force the cutting teeth into the metal.

It will be seen that the movement required for the cutting operation need only be slightly more than the gap formed between the two cutting elements adjacent the head 10, which are somewhat separated as the intermediate link is turned upwardly at the point where the chain extends into the guide. To secure the proper pressure upon the cutting element at the end of the guide, the links adjacent thereto toward the guide, contact with a roller 70 mounted on a pin 71 in the head.

It will be seen that by my invention of an articulated saw, a pipe may be severed by short oscillatory movements, not readily effected with the ordinary cutters which are expected to rotate in a continuous direction. My oscillatory saw enables the tool to be used on pipes already installed, and in various confined spaces. The sawing operation is rapid and effects a clean cut through the metal. It is a simple matter to remove any sawing element which may be dulled or damaged and replace it by another.

Having thus described my invention, what I claim is:

1. In a pipe cutter, the combination with an articulated saw composed of alined elements geared together, of means for contracting it about a pipe, and means for moving it circumferentially thereon.

2. In a pipe cutter, the combination of a plurality of saw elements arranged in file, each having a plurality of teeth meshing with those of the adjacent element, connecting links pivoted to said saw elements forming therewith a cutting chain, means for contracting the chain about the pipe, and means for giving the chain a circumferential movement.

3. In a pipe cutter, the combination with a frame, of an articulated saw carried thereby and adapted to be wrapped about a pipe, said saw consisting of a plurality of cutting elements arranged in file and pivotally connected and having intermeshing gear teeth.

4. In a pipe cutter, the combination of a series of cutting elements, links pivoted to adjacent elements and forming therewith a chain, gear teeth between the elements for maintaining the proper position of each element, and means for contracting the chain about a pipe.

5. In a pipe cutter, the combination of a plurality of elements, each provided with a plurality of cutting teeth, connecting links forming a chain with such elements, gear teeth formed on the elements, the teeth on one element meshing with those of the next adjacent element, said gear teeth functioning to prevent radial displacement of one element with relation to another or with relation to the pipe, and means connected with one end of the chain for contracting the same about a pipe.

6. In a pipe cutter, the combination of a plurality of concatenated saw elements, each consisting of a thin plate with cutting teeth arranged in an arc on its inner edge, connecting links pivoted to adjacent saw elements and forming therewith a cutting chain, means for contracting the chain about the pipe, and means for giving the chain a circumferential movement.

7. An articulated saw comprising a plurality of cutting elements arranged in file and pivotally connected together and provided with intermeshing gear teeth.

8. An articulated saw comprising a row of cutting elements, links pivoted to adjacent elements and forming therewith a chain, and intermeshing teeth between the elements.

9. A cutting element for a sawing chain consisting of a thin plate having an arcual inner edge on which are formed staggered teeth the ends of said plate being substantially normal to said arc.

10. An articulated saw comprising concatenated cutting elements having intermeshing teeth on their ends, each element having arcually arranged saw teeth on its inner edge.

11. An articulated saw comprising cutting elements arranged end to end in a series and having intermeshing teeth on their ends, each element having saw teeth on its inner edge, and links pivotally connected to successive elements and with them forming a chain.

12. An articulated saw comprising cutting elements arranged end to end in a series and connected by links pivoted to them, each element consisting of a thin plate having an arcual inner edge on which are formed staggered cutting teeth, the ends of the plates being provided with gear teeth, the teeth of successive plates intermeshing.

13. An articulated saw comprising series of elements arranged in file, each element having arcually arranged saw teeth on its inner edge, the elements having end portions substantially normal to the arc of the saw teeth, and links pivotally connected to them and overlapping them and with them forming a chain.

14. An articulated saw adapted to be wrapped about a pipe and consisting of a plurality of elements arranged in file and pivotally connected and having intermeshing gear teeth.

In testimony whereof I hereunto affix my signature.

IRA W. NONNEMAN.